UNITED STATES PATENT OFFICE 2,396,217

ADDITION OF ALKYL RADICALS TO ORGANIC COMPOUNDS

William E. Vaughan and Frederick F. Rust, Berkeley, Calif., assignors to Shell Development Company, San Francisco, Calif., a corporation of Delaware No Drawing. Application April 26, 1944, Serial No. 532,891

15 Claims. (Cl. 260—676)

This invention relates to the addition of alkyl radicals to organic compounds, and more particularly to a process whereby alkyl radicals, especially methyl radicals, are attached to saturated or unsaturated hydrocarbons to produce saturated and/or unsaturated hydrocarbons containing a greater number of carbon atoms per molecule than the starting hydrocarbon thus treated.

It has been discovered that di(tertiary alkyl) peroxides having the general formula

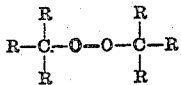

wherein each R represents a like or different saturated aliphatic radical, e. g. methyl, ethyl, propyl, etc. radical, may be formed by the controlled non-explosive oxidation of saturated aliphatic hydrocarbons containing a tertiary carbon atom, this oxidation being effected with oxygen, in the presence of hydrogen bromide, and at an elevated temperature which is however below the spontaneous combustion temperature of the mixture. For example, di(tertiary butyl) peroxide may be produced by conveying a vaporous mixture of isobutane, oxygen and hydrogen bromide (which substances may, for instance, be used in a volumetric ratio of 2:2:1) through a reactor at ordinary or superatmospheric pressure and at a temperature of about 160° C. Still another method of producing di(tertiary alkyl) peroxides includes the step of reacting a saturated tertiary alkyl hydroperoxide, i. e. a compound having the general formula

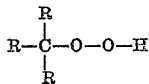

wherein each R represents a like or different saturated aliphatic radical, with a saturated tertiary alcohol, this reaction being effected at substantially atmospheric temperatures in the presence of an aqueous acid medium, e. g. aqueous sulfuric acid solution. As compared to the known organic peroxides, the di(tertiary alkyl) peroxides are surprisingly stable. For instance, di(tertiary butyl) peroxide does not explode even when ignited, but burns with a sooty flame. Also, it does not explode even when dropped onto a hot plate maintained, for example, at a temperature of about 250° C.

It has been discovered that di(tertiary alkyl) peroxides, and particularly those in which at least one of the alkyl radicals attached to the tertiary carbon atom is a methyl radical, when subjected to elevated temperatures, will decompose, and that such decomposition is accompanied by the liberation of alkyl radicals, e. g. methyl radicals. For instance, di(tertiary butyl) peroxide begins to decompose at an appreciable rate at a temperature of 190° C., said decomposition being substantially complete at about 200° C. Manifestly, the decomposition temperature will depend on the particular di(tertiary alkyl) peroxide subjected to the elevated temperature. Without any intention of being limited by any theory of the case, it is believed at the present time that this decomposition of the di(tertiary alkyl) peroxides takes place in accordance with a chain mechanism, which in the case of di(tertiary butyl) peroxide may be represented by the following equations:

$(CH_3)_3COOC(CH_3)_3 \rightarrow 2(CH_3)_3CO-$ $(CH_3)_3CO- \rightarrow CH_3- + (CH_3)_2C=O$ $CH_3- + (CH_3)_3COOC(CH_3)_3 \rightarrow$
$\qquad C_2H_6 + (CH_3)_2C=O + (CH_3)_3CO-$ etc., wherein the dash (—) denotes a free radical. It is thus seen that the decomposition of di(tertiary butyl) peroxide results in the formation of acetone and of methyl radicals which produce ethane. In this connection, it must be noted that in accordance with the third step of the above-outlined chain mechanism, an attack of a free methyl radical on the peroxide causes a scission of a carbon-to-carbon bond, which results in the liberation of a methyl radical and in the continuation of the chain mechanism via the second of the above steps. Similarly, the decomposition of a di(tertiary alkyl) peroxide, in which each of the alkyl radicals attached to tertiary carbon atoms is an ethyl radical, results in the liberation of these ethyl radicals with the simultaneous formation of a ketone.

It has been further discovered that the presence of organic compounds which are otherwise stable under the operating conditions in the reaction zone, in which a peroxide of the above type is being subjected to decomposition, causes a reaction between the alkyl radicals and said organic compounds, the character of this reaction depending in part on the specific organic compound thus present in the reaction zone. Broadly stated, the reactions may be considered as comprising the addition of the liberated alkyl radicals to the double bonds if such are present in the organic compound, and/or the substitution of the liberated alkyl radicals for one or more of the hydrogen atoms present in the organic compound used as one of the reactants. Generally speaking, it has been found that the presence of unsaturated hydrocarbons containing an olefinic linkage in the alpha position in the reaction zone in which the peroxide is subjected to decomposition causes primarily the addition of the liberated alkyl radicals to such unsaturated hydrocarbons. Nevertheless, some substitution of the alkyl radicals (for one or more of the hydrogen atoms of the unsaturated hydrocarbon) may also occur. Thus, this reaction results in the formation of saturated and/or unsaturated hydrocarbons having a larger number of carbon atoms per molecule than the unsaturated organic compound, e. g. terminally unsaturated olefin, introduced into such reaction zone. It is believed that the organic compounds, e. g. olefins, participate in the reaction chain mechanism, which latter, in the case of reactions involving propylene and di(tertiary butyl) peroxide, may be represented by the following equations:

$$CH_3- + CH_2CH=CH_2 \longrightarrow CH_3\overset{|}{C}H-CH_2CH_3$$

$$CH_3\overset{|}{C}H-CH_2CH_3 + (CH_3)_3COOC(CH_3)_3 \longrightarrow$$

$$\overset{CH_3}{\underset{|}{CH_3CHCH_2CH_3}} + 2(CH_3)_2C=O + CH_3-$$

Instead of the second of the above equations, the secondary butyl radical may also react with another olefin molecule to produce the correspondingly higher molecular weight hydrocarbons, etc.

Paralleling the above outlined addition of two alkyl radicals, e. g. methyl radicals, to the double bond, there is still another reaction which apparently occurs during the interaction of the mentioned terminally unsaturated olefinic hydrocarbons with di(tertiary alkyl) peroxides at the temperatures at which the decomposition of the latter occurs. This reaction may be referred to as a substitution reaction, the presence of significant amounts of methane in the effluent mixture obtained during the aforementioned reaction of a terminally unsaturated olefinic hydrocarbon with di(tertiary butyl) peroxide, under the operating conditions, indicating that a hydrogen atom is removed from a terminal carbon atom of the hydrocarbon, thereby permitting the addition of a methyl radical thereto. For example, the interaction of a methyl radical with propylene may form methan and an alkyl radical (which may in turn react with the peroxide to give straight chain butylenes). The interaction of a methyl radical with 3-methyl butene-1 may cause the formation of the radical

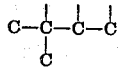

which may further react with the peroxide to add a methyl group and form a branched chain hexene. The above isopentene may also react to form

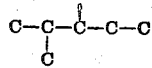

which may react further to produce branched chain hydrocarbons having still higher molecular weights. When the organic compound, e. g. hydrocarbon, present during the decomposition of the mentioned peroxides is saturated, the incorporation of alkyl radicals into such organic compounds is via substitution. Also, it has been found that such substitution reactions are predominant in the case of reactions involving peroxides and unsaturated hydrocarbons which contain an olefinic linkage in non-terminal position. It is thus seen that, in the case of unsaturated compound and particularly the terminally unsaturated olefins, there are several competing reactions which may be summarized as including the addition or substitution of alkyl radicals. Also, some polymerization of the olefinic hydrocarbons may occur. Generally, it has been found that the use of relatively high mol ratios of the olefinic hydrocarbons to the peroxides in the reaction zone tends to favor the incorporation of alkyl radicals into the olefinic hydrocarbon. The average molecular weight of the reaction product will increase with the exhaustion of the peroxides introduced into the reaction zone, and when the incorporation of alkyl radicals is desired it is preferred to maintain a desired or optimum concentration of the peroxide in said reaction zone by a continuous or intermittent introduction of additional amounts thereof.

Although any organic compound capable of liberating alkyl radicals by a carbon-to-carbon scission may be used as the source of such radicals, it is preferred to employ organic peroxides, particularly the aliphatic peroxides capable of yielding alkyl radicals, e. g. methyl, ethyl, propyl, etc. radicals, under the operating conditions. A particularly suitable class of organic peroxides which may be employed as one of the reactants to yield the alkyl radicals comprises the di(tertiary alkyl) peroxides in which each of the carbon atoms directly linked to the peroxy oxygen atoms is a tertiary carbon atom. This class of peroxides may be represented by the following formula:

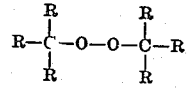

wherein each R represents a like or different aliphatic radical, particularly a saturated aliphatic radical. In the case where it is desired to yield methyl radicals by the decomposition of these organic peroxides, at least one of the radicals attached to each of the tertiary carbon atoms in the above formula should be the methyl radical. The following are illustrative examples of such di(tertiary alkyl) peroxides: di(tertiary butyl) peroxide, di(2-methyl butyl-2) peroxide, di(2-methyl pentyl-2) peroxide, di(2-ethyl pentyl-2) peroxide, di(3-methyl pentyl-3) peroxide, and their homologues, as well as peroxides of the above class in which one or more of the aliphatic radicals attached to the tertiary carbon atoms (which in turn are directly attached to the peroxy oxygen atoms) are substituted by or contain aryl, aralkyl, alkaryl and/or alicyclic radicals, examples of such compounds being di(1-phenyl 1-methyl propyl-1) peroxide, di(1-phenyl 2-methyl pentyl-2) peroxide, di(1-phenyl 2-ethyl pentyl-2) peroxide, and di(1-cyclohexyl 1-methyl pentyl-1) peroxide. Obviously, it is possible to use asymmetrical peroxides of the above class, e. g. tertiary butyl-tertiary amyl peroxide. Instead of using the above organic peroxides in which each of the carbon atoms directly linked to the peroxy oxygen atoms is a tertiary carbon atom, it is also possible to employ aliphatic peroxides in which such carbon atoms directly linked to the peroxy oxygen atoms are of a primary or secondary character. Examples of such peroxides are diethyl peroxide, lauroyl peroxide, as well as asymmetrical dialkyl peroxides, e. g. ethyl tertiary butyl peroxide, in which one of the carbon atoms directly linked to one of the peroxy oxygen atoms is a tertiary carbon atom, while the other peroxy oxygen atom is directly attached to a carbon atom of secondary character.

Any organic compound, particularly those which are relatively stable under the employed operating conditions, may be used together with the above mentioned peroxides to produce organic compounds containing a larger number of carbon atoms per molecule than the starting organic compound. The process of this invention is especially suitable for the incorporation of alkyl radicals, e. g. methyl radicals, into any saturated and/or unsaturated hydrocarbons, as well as their products of substitution. The following are representative examples of the saturated hydrocarbons: ethane, propane, pentanes, and their homologues, as well as the alicyclic or polymethylene hydrocarbons such as cyclopropane, methyl cyclopropane, cyclobutane, cyclopentane, etc. Also, the partially halogenated derivatives of such saturated alkyl and alicyclic hydrocarbons, e. g. n-propyl chloride, secondary butyl chloride, etc. may be employed. As to the unsaturated hydrocarbons, it is possible to use both the terminally and non-terminally unsaturated compounds, it being noted that the former react both by addition and substitution, while in the case of non-terminally unsaturated hydrocarbons the reaction is preferably one of substitution. Representative unsaturated compounds which may be subjected to reaction with alkyl radicals in accordance with the present invention include primary, secondary and/or tertiary olefins such as ethylene, propylene, normal butylenes, isobutylene, the amylenes, hexylenes, heptylenes, and the like; the alicyclic unsaturated hydrocarbons such as cyclobutene, cyclopentene, cyclohexene, and the like. The aliphatic and cycloaliphatic saturated and unsaturated hydrocarbons of the above class may also be linked to one or more cycloalkyl and/or aromatic radicals, compounds such as 1-phenyl propene-2 and 1-phenyl butene-2 and the like falling within this class. The various substituted derivatives of these hydrocarbons, such as their chlorides, nitrates, ketones and the like, may also be employed. For instance, it is possible to react allyl chloride to produce a reaction mixture containing chlorbutenes as well as chlorisopentane. It is to be noted that compounds such as acetone, acetic acid, and the like, in which the methyl groups are adjacent to carbonyl groups, are relatively non-reactive.

The incorporation of alkyl radicals, e. g. the methylation (which term includes both mono- and di-methylation), in accordance with the process of the present invention is preferably effected in the vapor phase and in a batch, intermittent or continuous manner. The reaction temperature must be such that the organic peroxide, e. g. the di(tertiary alkyl) peroxides of the above defined class, will decompose, the optimum operating temperature obviously depending on the particular compounds employed as well as on the pressures, ratios of reactants, residence time, and the like. Generally speaking, the temperature will vary between about 150° C. and the temperature at which substantial degradation of the hydrocarbons or their derivatives present in the reaction occurs. A preferred range is between about 175° C. and about 275° C., optimum yields of the desired products resulting from the addition or incorporation of alkyl radicals, e. g. methylation having been obtained, particularly in the case of di(tertiary butyl) peroxide, when the reaction was effected at substantially atmospheric pressure and at temperatures of between about 200° C. and about 240° C. As to the pressures, the reaction may be effected under atmospheric or superatmospheric pressure, the latter being preferred in some cases because of the possibility of obtaining greater throughput per unit of time per unit of reaction space. The ratio of reactants may also vary. In the case of the use of olefins, the presence of relatively high olefin-to-peroxide ratios tends to yield greater amounts of products of methylation (based on peroxide introduced), particularly when the operating temperature is not excessively high. Mol ratios of hydrocarbons to peroxides of from 1:1 to about 15:1 may be employed, the preferred ratio being in the neighborhood of from about 5:1 to about 10:1. In the case where the starting organic compound to be alkylated has a relatively high boiling temperature, it may be advisable to employ inert diluents and/or carriers which will permit the maintenance of such hydrocarbons in the vapor state.

In a preferred embodiment of the invention, the reactants employed in suitable or optimum amounts are conveyed through a reaction tube maintained at the desired temperature, the rate of throughput being such that the reactants are in the reaction zone for a period of time sufficient to effect a substantial decomposition of the peroxide, said decomposition yielding the alkyl, e. g. methyl radicals, which react with the organic reactant, e. g. the hydrocarbon. The effluent mixture may then be treated to recover the products resulting from the incorporation of alkyl radicals (as well as the products of polymerization, if any), and the unreacted reactants may then be recycled back into the feed to the reaction zone.

The following examples are illustrative of the process of effecting the addition of methyl radicals to the terminally unsaturated olefinic compounds.

*Example I*

An equivolumetric mixture of ethylene and di(tertiary butyl) peroxide was conveyed through a Pyrex glass tube at such a rate that approximately 200 cc. of vapor volume (calculated at room temperature) were introduced per minute. The reaction tube was maintained at a temperature of 225° C. The reaction time was slightly less than ½ minute. The effluent reaction product leaving the reaction zone was collected and analyzed. It was found that approximately 9.0% of the introduced ethylene reacted per pass, and that approximately 89.6% of the di(tertiary butyl) peroxide was decomposed. An analysis of the reaction products showed also that, as calculated on the mol per cent of the reacted peroxide, this peroxide was converted to acetone, ethane, butane and hexane in the following percentages:

| | Per cent |
|---|---|
| Acetone | 100 |
| Ethane | 82.3 |
| Butane | 6.8 |
| Hexane | 1.6 |

*Example II*

Three separate runs were conducted under the same conditions as those employed in Example I, with the exception that the ratios of the ethylene to the peroxide in the three runs were 2:1, 4:1 and 9:1 respectively. Upon analysis of the reaction products, the conversion and yields were found to be as follows:

| Ratio of ethylene to peroxide | 2:1 | 4:1 | 9:1 |
|---|---|---|---|
| Per cent ethylene reacted | 10.0 | 8.5 | 3.5 |
| Per cent peroxide reacted | 94.2 | 80.4 | 59.2 |
| Mol per cent reacted peroxide converted to: | | | |
| Acetone | 100 | 100 | 100 |
| Ethane | 68.2 | 62.1 | 40.7 |
| Butane | 14.2 | 15.1 | 29.8 |
| Hexane | 4.6 | 13.4 | 10.2 |

Example III

A mixture of ethylene and di(tertiary butyl) peroxide, employed in a ratio of 9:1, was conveyed at a rate of 200 cc. per minute of vapor volume, as calculated at room temperature, through the aforementioned Pyrex glass tube, which was however heated to 235° C. An analysis of the effluent showed that 7.2% of the ethylene reacted, with 63.5% of the peroxide reacting per pass. The mol percent of the reacted peroxide converted to the various compounds was found to be as follows:

| | Percent |
|---|---|
| Acetone | 87.2 |
| Ethane | 61.6 |
| Butane | 13.6 |
| Hexane | 16.0 |

Example IV

A vaporous mixture comprising propylene and di(tertiary butyl) peroxide was conveyed through a Pyrex reaction tube maintained at a temperature of 225° C. The propylene was conveyed at a rate of 140 cc. per minute, while the rate of throughput of the peroxide was equal to 70 cc. per minute of vapor, calculated at room temperature and atmospheric pressure. The effluent mixture upon analysis showed that isopentane was produced in a yield of 25.4% based on the amount of introduced peroxide, and that the butylenes were produced in a yield of about 7%. About ⅔ of the butylenes consisted of butene-1, the remainder being butene-2. Lesser amounts of normal and isobutane, isobutylene, other pentanes and amylenes, etc. were also found in the reaction product.

Example V

Isobutylene and di(tertiary butyl) peroxide vapors were conveyed through a reaction tube at such a rate that 140 cc. per minute of isobutylene and 70 cc. per minute of the peroxide were used. The reaction temperature was 235° C. The effluent product upon analysis showed that satisfactory yields of neohexane and tertiary amylenes, together with isopentane, were attained.

Example VI

Propylene and di(tertiary alkyl) peroxide are mixed in a volumetric ratio of about 5:1, and the vaporous mixture thus formed is conveyed through a reaction zone maintained at a temperature of about 235° C. The effluent product from said reaction contains appreciable amounts of isopentane and butylenes, with minor amounts of the butanes and higher homologues.

Example VII

A vaporous mixture comprising butene-2 and di(tertiary butyl) peroxide was conveyed through a Pyrex reaction tube maintained at a temperature of about 235° C. The butene-2 was conveyed at a rate of 140 cc. per minute, while the rate of throughput of the peroxide was equal to 70 cc. of vapor per minute, calculated at room temperature and atmospheric pressure. An analysis of the effluent mixture showed that it contained material amounts of tertiary amylenes and pentene-2, with a smaller amount of isopropyl ethylene.

Example VIII

When propane and di(tertiary butyl) peroxide were subjected to a temperature of about 225° C., the reaction product contained isobutane and butene-1.

Example IX

The reaction of isobutane with di(tertiary butyl) peroxide under the above defined conditions resulted in an effluent containing neopentane and isobutylene.

Example X

A vaporous mixture containing an excess of allyl chloride and di(tertiary butyl) peroxide, when subjected to a temperature of about 225° C., forms a reaction product containing 2-chlorbutene-1, 1-chlorbutene-2, and chlorisopentane.

We claim as our invention:

1. In a process of producing amylenes, the steps of mixing butene-2 and di(tertiary butyl) peroxide in a vapor-volume ratio of about 2:1 and subjecting the vaporous mixture thus formed to a temperature of about 235° C., thereby effecting the decomposiiton of the peroxide and the methylation of the butene-2.

2. In a process of methylating butene-2, the steps of forming a vaporous mixture comprising butene-2 and di(tertiary butyl) peroxide in a volumetric ratio of between about 1:1 and about 15:1, subjecting the vaporous mixture thus formed to a temperature of between about 200° C. and about 240° C. for a period of time sufficient to effect a substantial decomposition of the peroxide and the methylation of butene-2, and recovering said products of methylation from the reaction mixture.

3. In a process of methylating butene-2, the steps of forming a vaporous mixture comprising butene-2 and di(tertiary butyl) peroxide in a volumetric ratio of between about 1:1 and about 15:1, subjecting the vaporous mixture thus formed to a temperature of between about 175° C. and about 275° C. for a period of time sufficient to effect the substantial decomposition of the peroxide and the methylation of the butene-2, and recovering the products of methylation from the reaction mixture.

4. In a process of methylating butene-2, the step of subjecting a vaporous mixture comprising butene-2 and a substantial amount of di(tertiary butyl) peroxide to a temperature of between about 175° C. and about 275° C. for a period of time sufficient to effect the substantial decomposition of the peroxide thereby effecting the methylation of the butene-2.

5. In a process of methylating an olefin, the steps of subjecting a vaporous mixture comprising a substantial amount of di(tertiary butyl) peroxide and an unsaturated hydrocarbon containing an olefinic linkage in non-terminal position to a temperature of between about 175° C. and about 275° C. for a period of time sufficient to effect the substantial decomposition of the peroxide, thereby effecting the methylation of the unsaturated hydrocarbon.

6. In a process of incorporating alkyl radicals into unsaturated hydrocarbons, the step of subjecting a vaporous mixture comprising an unsaturated hydrocarbon containing an olefinic linkage in non-terminal position and a substantial amount of a di(tertiary alkyl) peroxide to a temperature of between about 150° C. and about 275° C. for a period of time sufficient to effect the substantial decomposition of the peroxide, thereby effecting the incorporation of alkyl radicals into the unsaturated hydrocarbon.

7. In a process of methylating propane, the steps of forming a vaporous mixture comprising propane and di(tertiary butyl) peroxide in a volumetric ratio of between about 1:1 and about 15:1 and subjecting the vaporous mixture thus formed to a temperature of between about 200° C. and about 240° C. for a period of time sufficient to effect the substantial decomposition of the peroxide, thereby effecting the methylation of the propane.

8. In a process of methylating propane, the steps of forming a vaporous mixture comprising propane and a substantial amount of di(tertiary butyl) peroxide, and subjecting said vaporous mixture to a temperature of between about 175° C. and about 275° C. for a period of time sufficient to effect the substantial decomposition of the peroxide.

9. In a process of methylating isobutane, the steps of forming a vaporous mixture comprising isobutane and di(tertiary butyl) peroxide in a volumetric ratio of between about 1:1 and about 15:1, subjecting the vaporous mixture thus formed to a temperature of between about 200° C. and about 240° C. for a period of time sufficient to effect the substantial decomposition of the peroxide and the methylation of the isobutane, and recovering said products of methylation from the reaction mixture.

10. In a process of methylating isobutane, the steps of forming a vaporous mixture comprising isobutane and di(tertiary butyl) peroxide in a volumetric ratio of between about 1:1 and about 15:1, subjecting the vaporous mixture thus formed to a temperature of between about 175° C. and about 275° C. for a period of time sufficient to effect the substantial decomposition of the peroxide and the methylation of isobutane, and recovering the products of methylation from the reaction mixture.

11. In a process of methylating isobutane, the step of subjecting a vaporous mixture comprising isobutane and a substantial amount of di(tertiary butyl) peroxide to a temperature of between about 175° C. and about 275° C. for a period of time sufficient to effect a substantial decomposition of the peroxide, thereby effecting the methylation of the isobutane.

12. In a process of methylating saturated hydrocarbons, the steps of forming a vaporous mixture comprising a saturated hydrocarbon and a substantial amount of a di(tertiary butyl) peroxide, and subjecting the vaporous mixture thus formed to a temperature of between about 175° C. and about 275° C. for a period of time sufficient to effect the substantial decomposition of the peroxide.

13. In a process of incorporating alkyl radicals into saturated hydrocarbons, the step of subjecting a vaporous mixture comprising a saturated hydrocarbon and a substantial amount of a di(tertiary alkyl) peroxide to a temperature of between about 150° C. and about 275° C. for a period of time sufficient to effect the substantial decomposition of the peroxide, thereby effecting the incorporation of alkyl radicals into said saturated hydrocarbon.

14. In a process of effecting the incorporation of alkyl radicals, the step of subjecting a vaporous mixture comprising a hydrocarbon and a substantial amount of a di(tertiary alkyl) peroxide to a temperature of between about 150° C. and about 275° C. for a period of time sufficient to effect a substantial decomposition of the peroxide, thereby effecting the incorporation of alkyl radicals into the hydrocarbon.

15. In a process of incorporating alkyl radicals, the step of subjecting a vaporous mixture comprising an organic compound and a substantial amount of a di(tertiary alkyl) peroxide to a temperature of between about 150° C. and about 275° C. for a period of time sufficient to effect a substantial decomposition of the peroxide and the incorporation of alkyl radicals thus formed into the organic compound.

WILLIAM E. VAUGHAN.
FREDERICK F. RUST.